Nov. 27, 1951 L. N. POND 2,576,191
GLASS BLOWING MACHINE
Filed Oct. 15, 1946 12 Sheets—Sheet 4
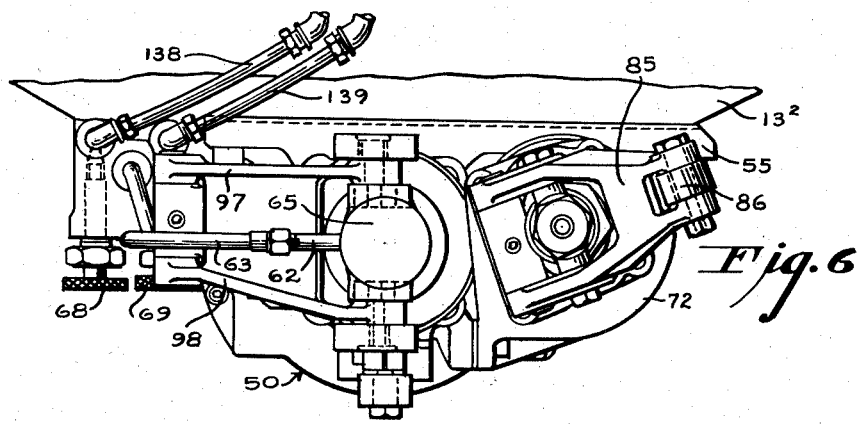
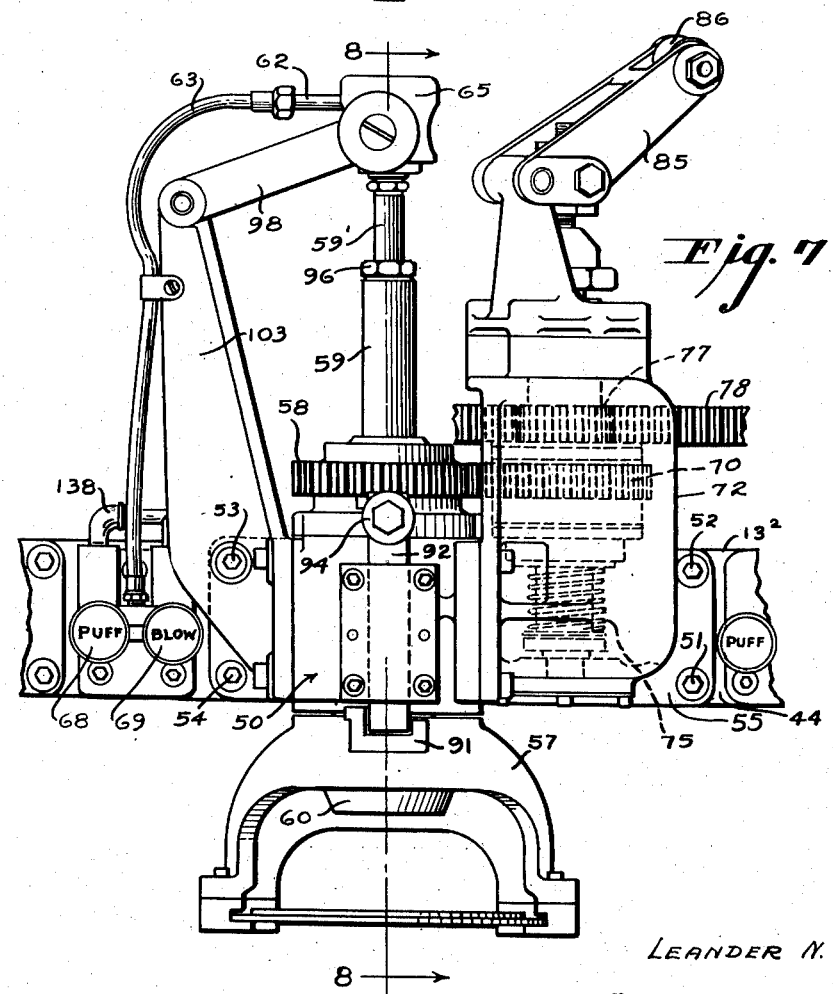
Inventor
LEANDER N. POND
By Knight & Fowler
Attorneys Nov. 27, 1951  L. N. POND  2,576,191
GLASS BLOWING MACHINE
Filed Oct. 15, 1946   12 Sheets-Sheet 5

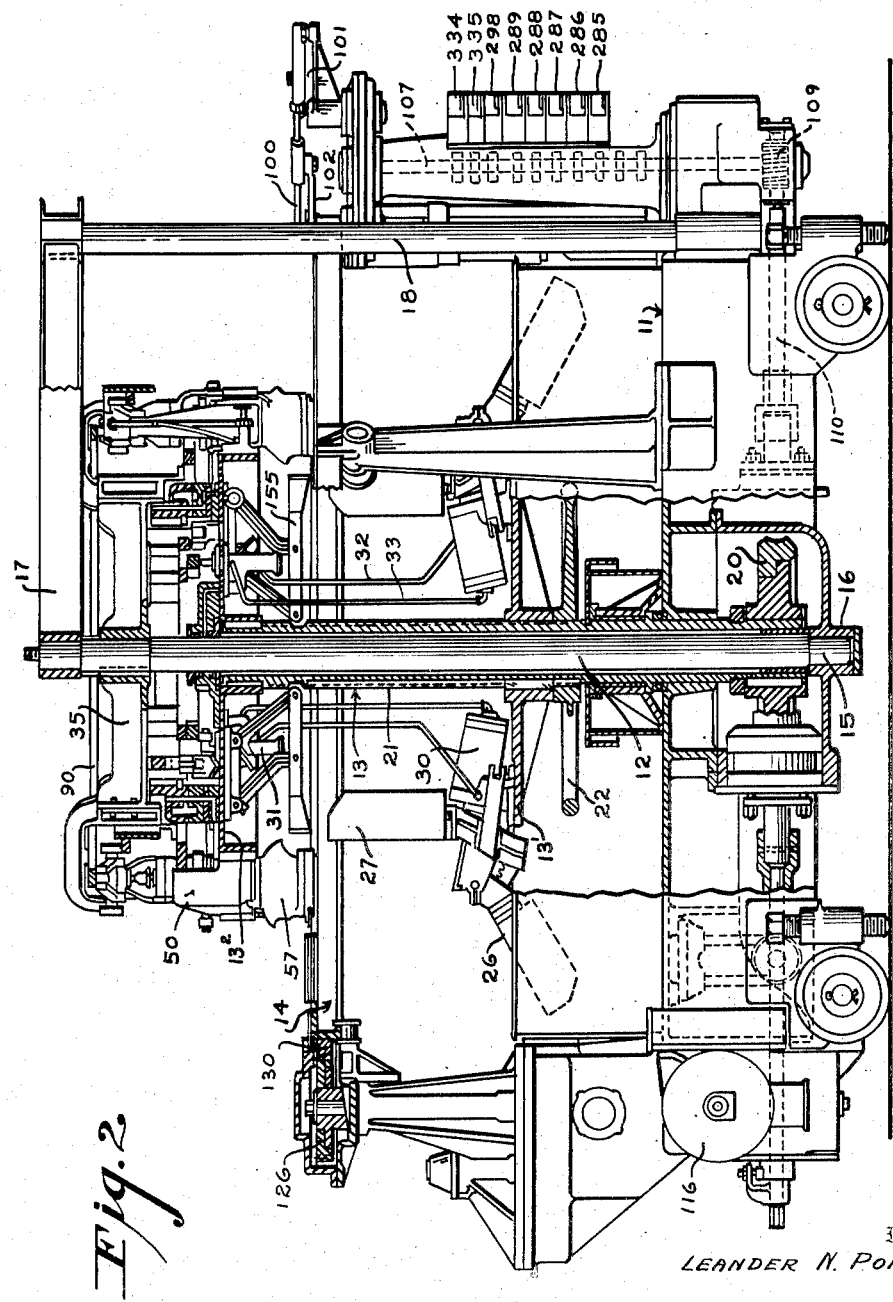

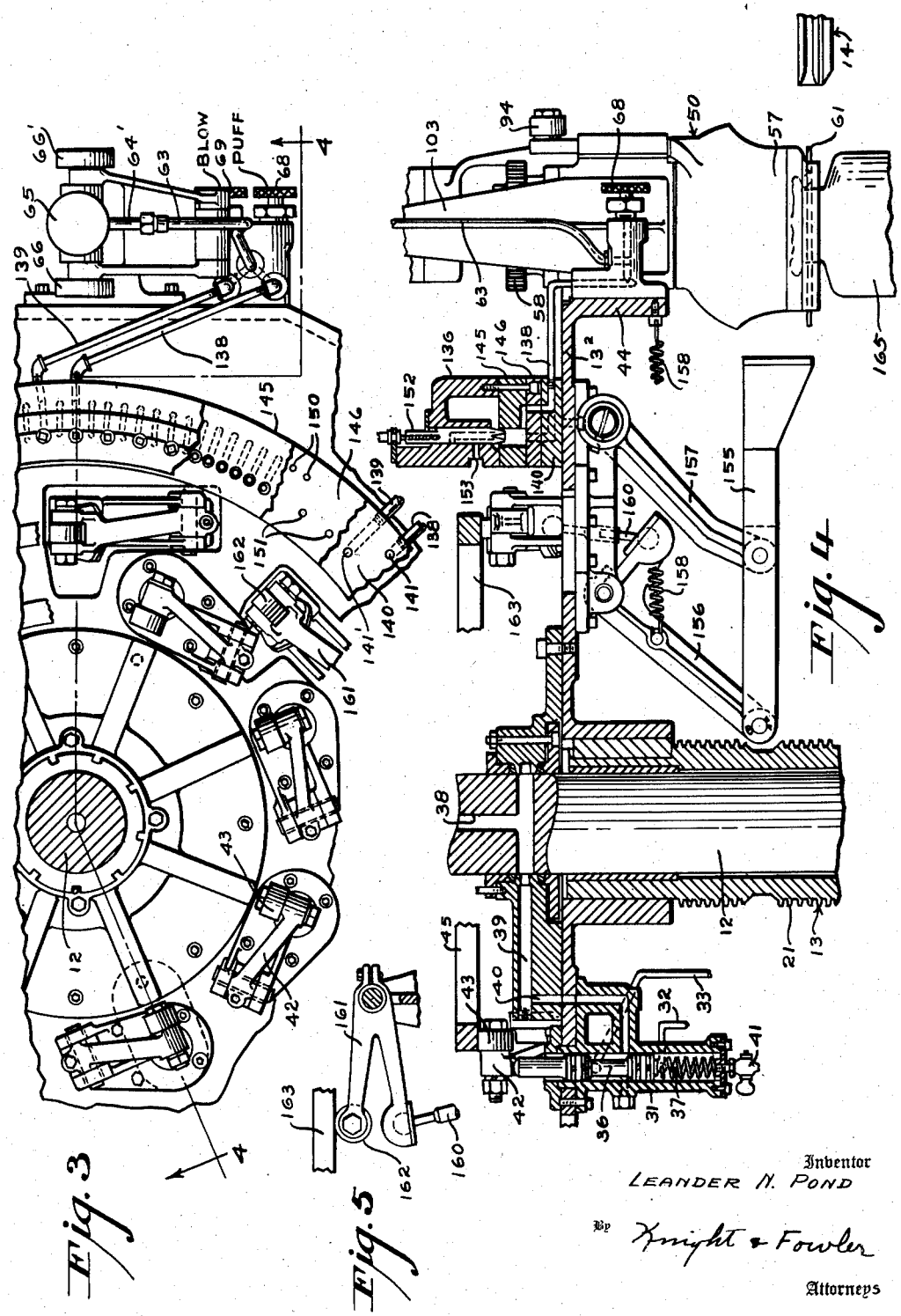

Inventor
LEANDER N. POND
By Knight & Fowler
Attorneys

Nov. 27, 1951     L. N. POND     2,576,191
GLASS BLOWING MACHINE
Filed Oct. 15, 1946     12 Sheets-Sheet 6
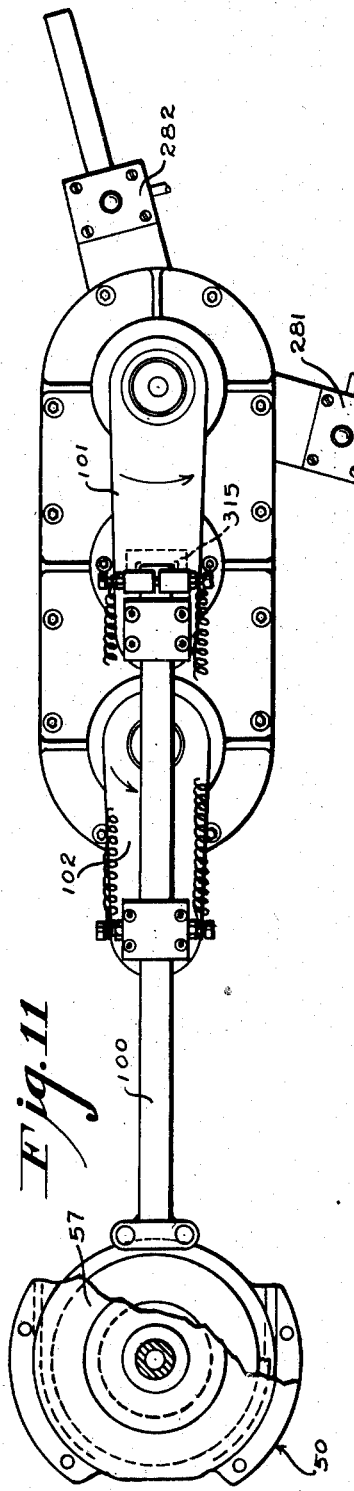
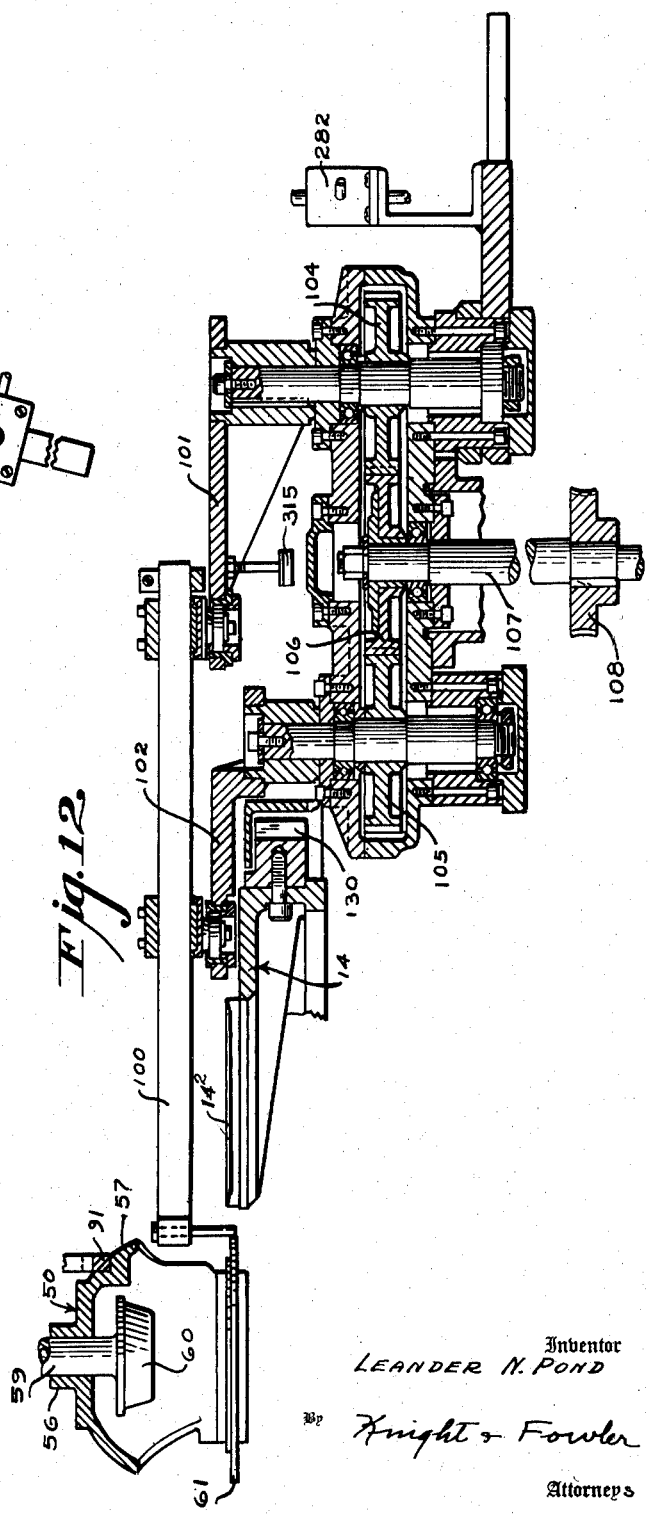
Inventor
LEANDER N. POND
By Knight & Fowler
Attorneys

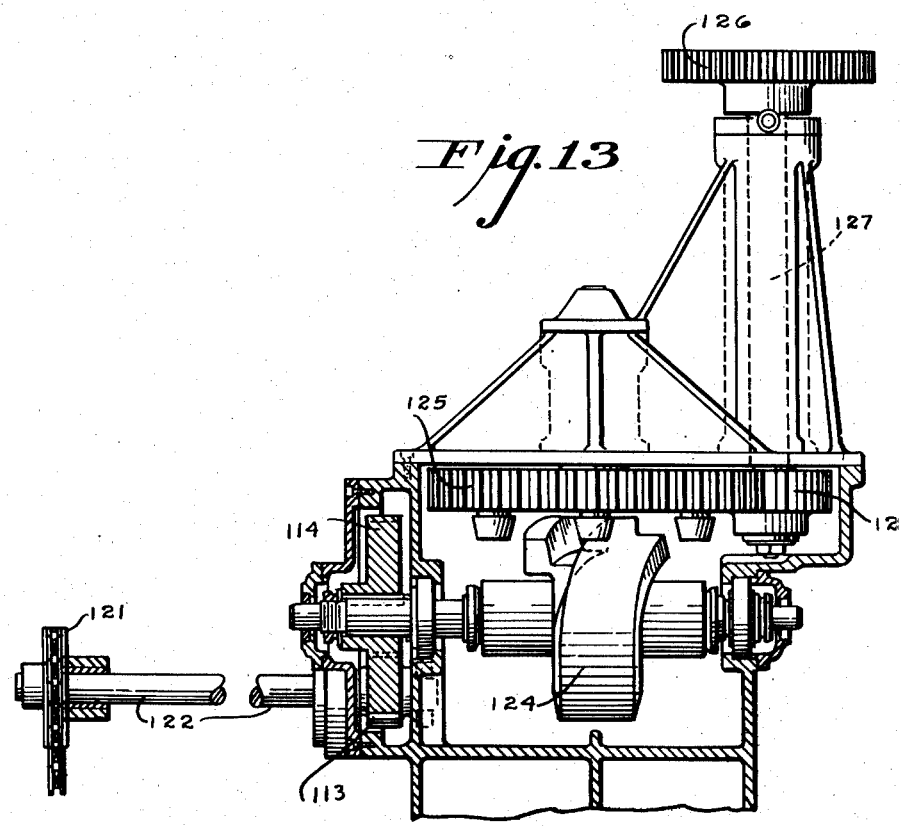

Inventor
LEANDER N. POND
By Knight & Fowler
Attorneys

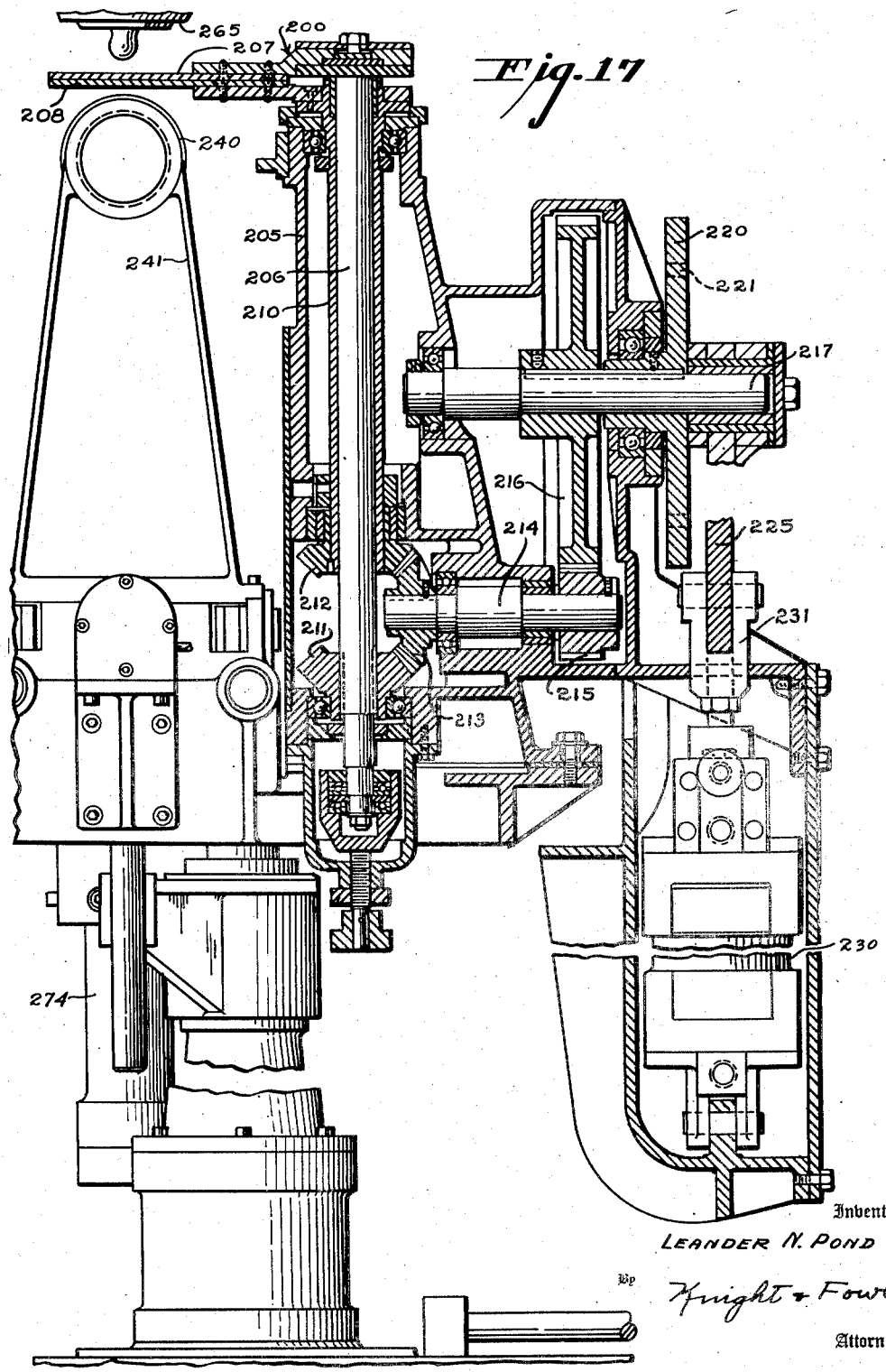

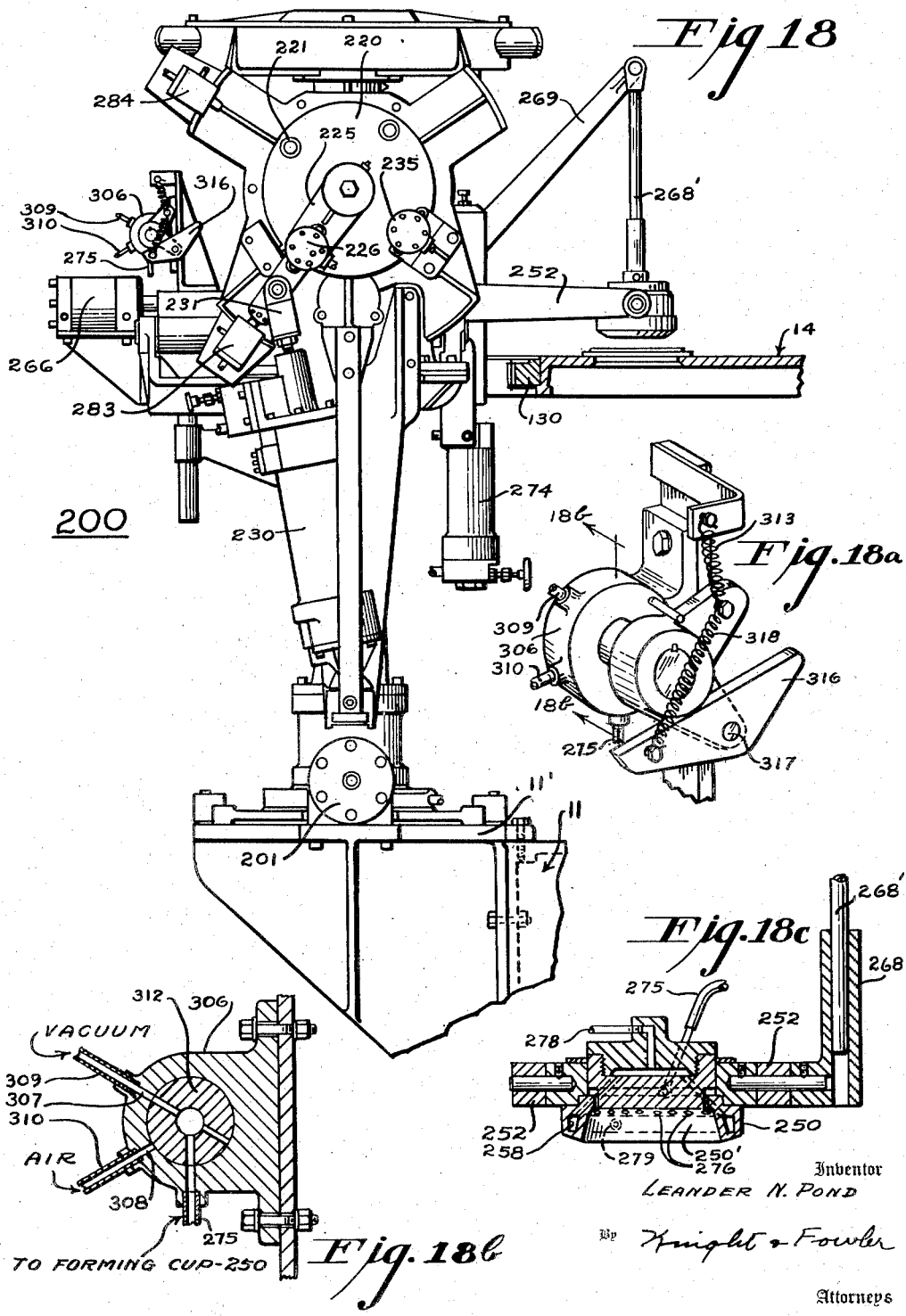

Nov. 27, 1951 — L. N. POND — 2,576,191
GLASS BLOWING MACHINE
Filed Oct. 15, 1946 — 12 Sheets-Sheet 11
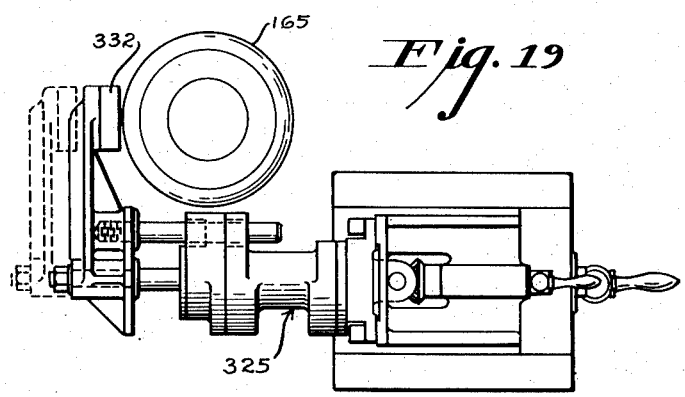
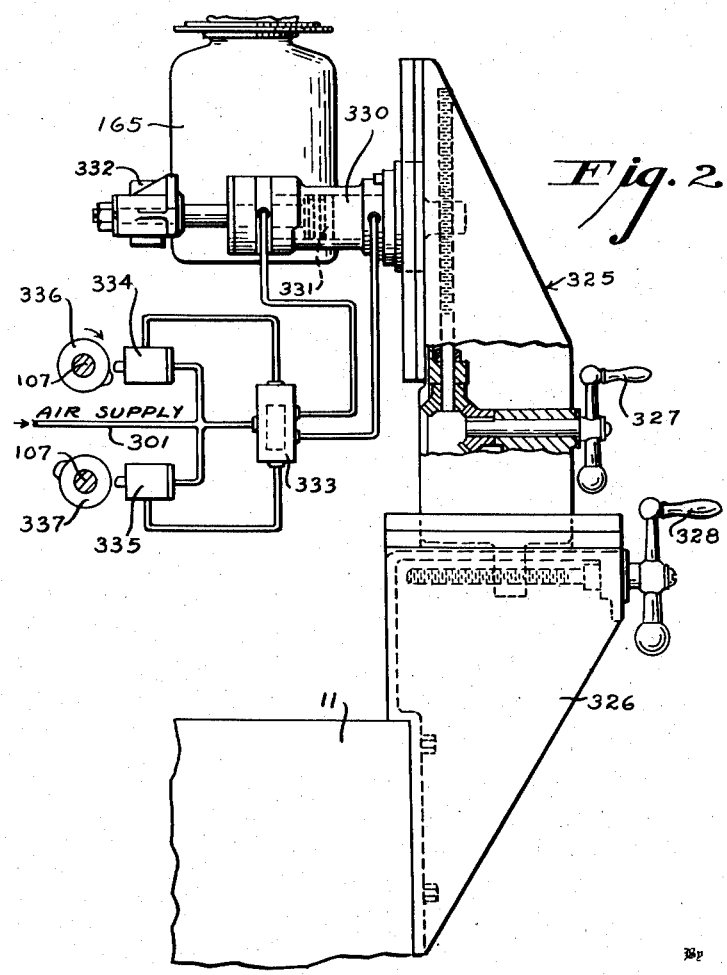
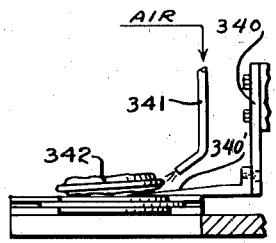
Inventor
LEANDER N. POND
By Knight & Fowler
Attorneys Nov. 27, 1951  L. N. POND  2,576,191
GLASS BLOWING MACHINE
Filed Oct. 15, 1946  12 Sheets-Sheet 12

Inventor
LEANDER N. POND
By Knight + Fowler
Attorneys

Patented Nov. 27, 1951

2,576,191

UNITED STATES PATENT OFFICE 2,576,191

GLASS BLOWING MACHINE

Leander N. Pond, Corning, N. Y., assignor to Corning Glass Works, Corning, N. Y., a corporation of New York Application October 15, 1946, Serial No. 703,442

15 Claims. (Cl. 49—5)

The present invention relates to glass working apparatus and particularly to a machine suitable for use in the quantity production, fully automatic, of bottles, light bulbs, tumblers, lamp chimneys, and similar hollow glass articles.

One object of the invention is a compact assembly which can be readily moved into and out of operative relation with a forehearth.

Another object is an automatic machine on which a wide range of shapes and sizes of hollow ware can be made.

Another object is an automatic blowing machine of a capacity justifying its use over machines having capacities beyond the need for certain items or varieties of items of production.

Other objects and features of the invention will become apparent from a study of a machine embodying one form of the invention herein disclosed and described in detail.

In the accompanying drawings

Fig. 2 is an elevation of the machine shown partly in section and with the glass severing, parison forming and transfer portion omitted therefrom.

Fig. 3 is an enlarged plan view of a fragment of the machine with certain parts broken away.

Fig. 4 is a view taken on line 4—4 of Fig. 3.

Fig. 5 is a detail of a push-out linkage.

Fig. 6 is an enlarged plan view of a fragment of the outer turret and of one of a number of similar blowhead assemblies supported thereby.

Fig. 7 is a side elevational view of the apparatus of Fig. 6.

Fig. 11 is a plan view on an enlarged scale of the orifice plate push-in mechanism and of a fragment of a blowhead and orifice ring support assembly.

Fig. 12 is a sectional elevation of Fig. 11.

Fig. 13 is an enlarged elevational view, partly in section, illustrating the indexing drive arrangement.

Fig. 17 is an enlarged elevational view, partly in section, of the shearing, parison forming and transfer assembly, associated with a glass feeder orifice.

Fig. 18 is an enlarged elevational view of the shearing, parison forming and transfer assembly illustrating its support by the machine frame proper and a parison forming element in position to deliver a parison to a ring supported by the outer turret of the machine.

Fig. 18a is an enlarged perspective view of a special valve assembly for alternately connecting a source of vacuum and air to one of the parison forming units.

Fig. 18b is a sectional view on line 18b—18b of Fig. 18a.

Fig. 18c is an enlarged sectional view illustrating details of the forming unit which delivers the parison.

Fig. 19 is a plan view on an enlarged scale of the crack-off mechanism as it is about to effect a crack-off operation.

Fig. 20 is an enlarged side elevational view of the crack-off mechanism, partly in section, and showing the manner of support on the base of the machine proper.

Fig. 21 is an enlarged fragmentary view in elevation and partly in section illustrating the apparatus for removing cullet from an orifice plate as occurs following a crack-off operation.

Figure 22:
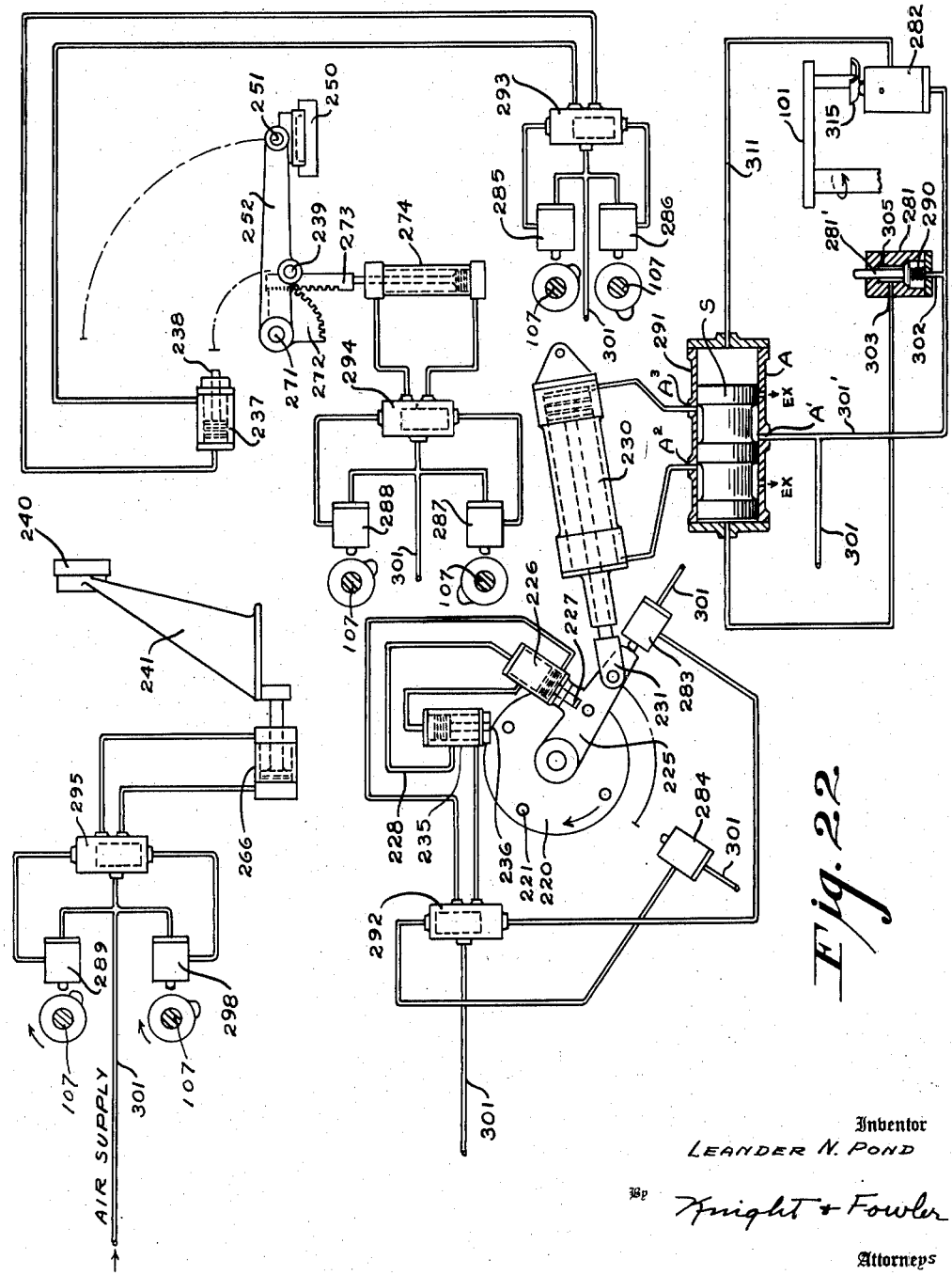

Fig. 22 diagrammatically illustrates the several mechanisms of the shearing, parison forming and transfer assembly, their operating units and cams of the machine which initiate their respective operations.

General operation

Figure 1:
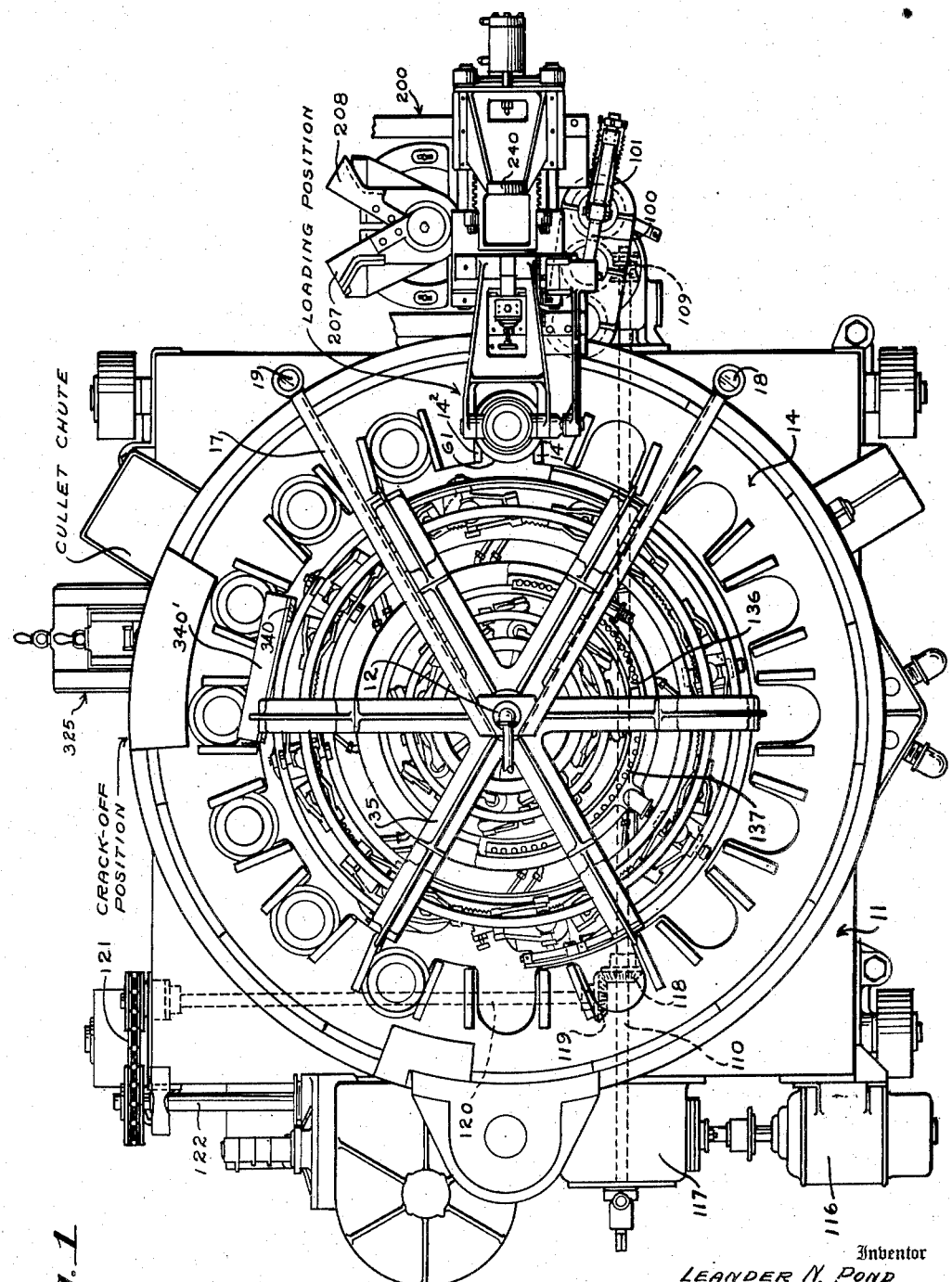
Fig. 1 is a plan view of the machine.

As may be best understood from an inspection of Figs. 1 and 17, a charge of glass is sheared and caught between a pair of parison forming members by assembly 200 and the parison thus formed is deposited on an orifice plate 61 which is at the time indexed at a loading position by an outer holder or turret, generally designated 14 and on which a number of orifice plate positions are provided. During a subsequent indexing moving of turret 14 a pusher 10 (Figs. 1, 11 and 12) transfers the loaded orifice plate to a support forming part of a blowhead assembly, generally designated 50 (Fig. 2), supported by an inner holder or turret, generally designated 13 (Fig. 2). During the first portion of travel with turret 13 puff air is supplied to the parison to partly expand it. As travel of the parison continues a mold closes about it, and then the parison is blown to final form following which the mold moves clear of the finished article. Thereafter a pusher 155 (Fig. 4) returns the orifice plate and finished article to the outer turret 14.

As the travel of the finished article continues, it becomes indexed at the crackoff position (Fig. 1) at which position the crackoff equipment 325, shown in detail in Figs. 19 and 20, strikes the article 165 breaking it away from the cullet on the upper side of the orifice plate. Fracture of the glass is assisted by a stationary knife blade 340' (Figs. 1 and 21) which enters as a wedge between the cullet and orifice plate as an article reaches the crack-off position. As indexing is resumed a blast of air from a pipe 341 is encountered and blows the cullet from the orifice plate into a cullet chute (Fig. 1). A spray of water may also be applied to the cullet to assist in freeing it from the orifice plate to keep the plate at best operating temperature. On subsequent indexing movements, the plate again arrives at the loading position to complete its cycle of operation.

*Detailed description*

Referring to Figs. 1 and 2 in particular, the machine includes a carriage bed generally designated 11 having a vertical column 12 about which turret assemblies generally designated 13 and 14 rotate. The lower end 15 of column 12 fits into a socket 16 forming a part of bed 11. The upper end of column 12 fits into an aperture in a frame 17 supported by posts 18 and 19 whose lower ends are anchored in bed 11. The end portion of column 12 just below frame 17 passes through and supports a hub from which radiates a number of spokes 35, at the free ends of which are supports for a number of tracks hereinafter specifically referred to.

Turret assembly 13 comprises a sleeve 21 surrounding column 12 and carrying a worm wheel 20 near its bottom end. At a higher level sleeve 21 has threaded thereon a hand wheel 22 on whose hub is supported a table 13' carrying a row of split mold assemblies each comprising paste mold halves 26 and 27 adapted to be opened and closed by a pneumatic power unit 30. Each unit 30 has an air supply valve 31 connected thereto by air lines 32 and 33 (Figs. 2 and 4). Valve 31 has a spool piston 36 biased by a spring 37 to the position shown in Fig. 4 to normally supply air, via passages 38—40 and line 33 to the proper end of its unit 30 to hold its mold halves in open position and to connect the opposite end of unit 30 to atmosphere via line 32 and a valve exhaust aperture 41, and is adapted to have its piston forced to its alternative position by a lever 42 having a roller 43 engaged by a cam track 45 which actuates the lever to reverse the air and exhaust connections to its unit 30 to close the mold. The molds, their operating units, and the manner of spraying them with water, as is common practice with pastemolds, may be similar to the disclosure in Gray et al. Patent No. 2,263,126 granted November 18, 1941.

The top end of sleeve 21 carries a table 13² having a surrounding depending flange 44 (Fig. 4) on which are mounted the combined blowhead and orifice plate support assemblies 50, similar to those employed in the machine disclosed in the cited Gray et al. patent. Each assembly 50 (Figs. 2, 4 and 6-8) is held in a casting 55 (Fig. 7 and 8) secured to the flange 44 by cap screws 51—54. Passing through the bore of casting 55 (Fig. 8) is a tubular spindle 56, at its bottom end having a bell shaped orifice plate support 57 and at its top end a spur gear 58 keyed thereto. A blowhead spindle 59 passes through the bore of spindle 56 and has its bottom end provided with a tip 60 adapted to cooperate with an orifice plate 61 arranged thereunder. The lower half of the enlarged portion of the bore of spindle 59 is occupied by a helical spring 89 engaged by a suitable packing gland 95 surrounding the lower end of a spindle 59' occupying the upper half of the bore of spindle 59. A retainer 96 surrounding a portion of reduced diameter of spindle 59' and threaded into the top of spindle 59 prevents spindle 59 from dropping off spindle 59' but permits movement of spindle 59' further into the bore of spindle 59 by compressing spring 89. The upper end of spindle 59' projects into an air supply chamber 64 carried by a yoke 65 and having a tube 62 extending therefrom for connection with an air supply line 63 (Fig. 7) extending to puff and blow valves 68 and 69 more fully described hereinafter. Two oppostie sides of yoke 65 have bosses 65' pierced to accommodate pins 99 passing through supporting and controlling rollers 66 and 66' and one end of guide arms (Figs. 6–8) 97 and 98. The other ends of guide arms 97 and 98 are pivoted to a supporting bracket 103 (Fig. 7). As will be readily understood from an inspection of Fig. 8a, rollers 66 and 66' pass off section A of their supporting tracks 67 and 67', enabling the blowhead tip 60 to drop by gravity into cooperative relation with glass on an orifice plate 61. Section B of the tracks 67 and 67' then engages the upper surfaces of the rollers 66 and 66' and forces spindle 59' further down into the bore of spindle 59, thus tending to compress spring 89 which in turn exerts additional pressure on spindle 59 to cause the blowhead tip 60 to make a positive seal with the glass during the subsequent blowing operations.

As indicated by the diagram, section B of tracks 67 and 67' terminates at the point in the travel of the blowhead assembly where the blowing operation has been completed. The rollers 66 and 66' at that time encounter the inclined end of section A of the tracks and accordingly the blowhead assembly is raised again to its elevated position.

Figure 8:
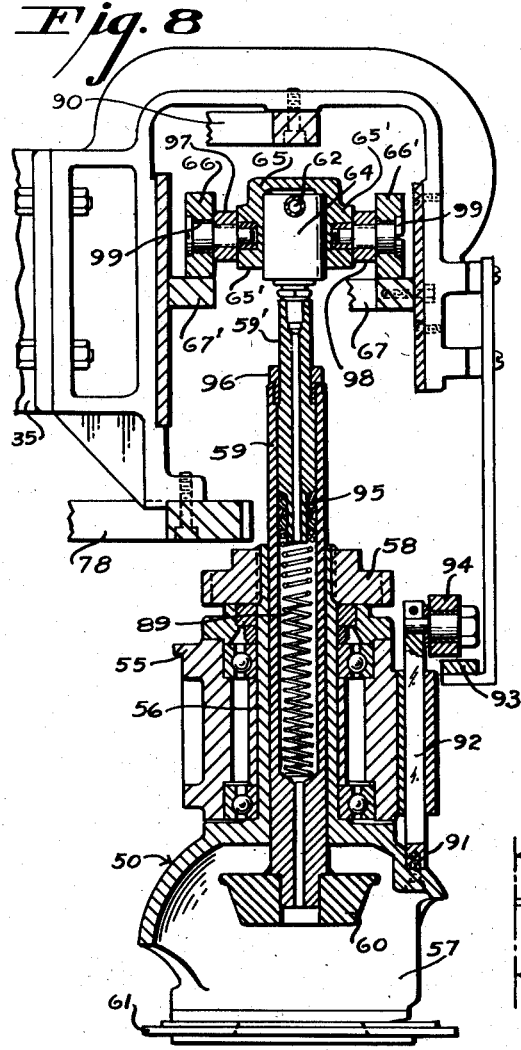
Fig. 8 is a sectional elevation taken on line 8—8 of Fig. 7 and with additional associated equipment supporting structure shown.
Figure 9:
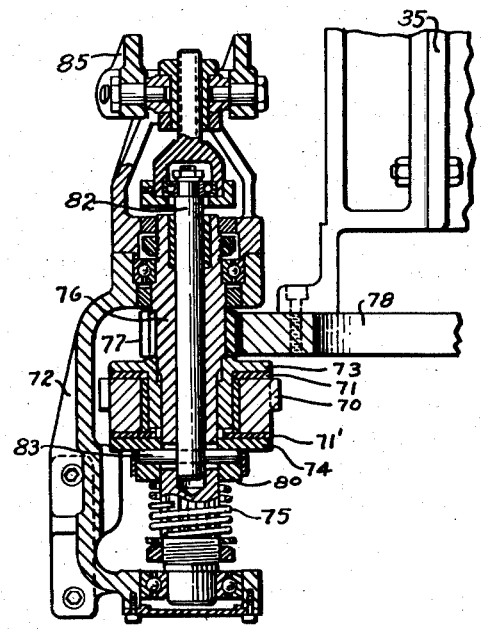
Fig. 9 is a sectional elevation of the unit shown in the right portion of Figs. 6 and 7 and with additional associated equipment supporting structure shown.
Figure 8A:
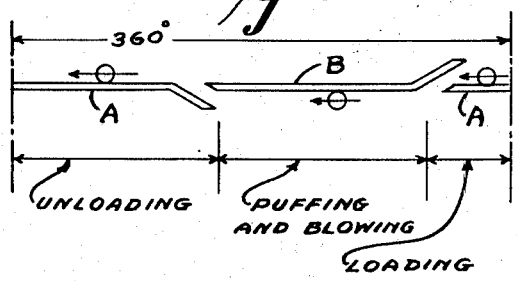
Fig. 8a is a straight line diagram illustrating the general contour of the blowhead control tracks.
Figure 10:
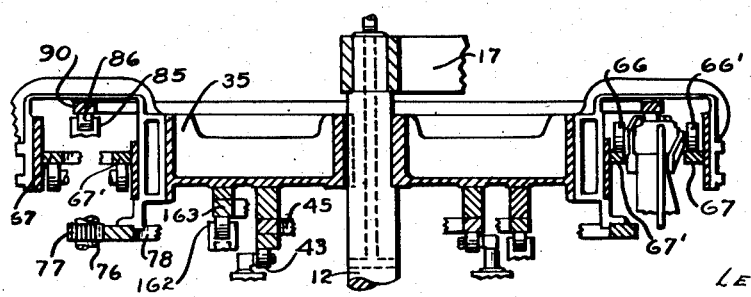
Fig. 10 is an enlarged sectional elevation of the upper portion of the machine with certain parts omitted for clarity.

It is desirable to effect rotation of a parison during the puff operation to maintain proper glass distribution and to effect relative movement between the glass and mold during the final blowing operation to impart a better finish to the object being blown. In the present structure these results are attained by rotation of the orifice plate support 57 by means of its gear 58. Gear 58 is in mesh with a drive gear 70 (Figs. 7 and 9) of a clutch assembly carried in a housing 72 secured to casting 55. The clutch assembly includes a vertically disposed tubular shaft 76 mounted for rotation in housing 72 and having a drive pinion 77 keyed thereon in mesh with a ring gear 78 about which pinion 77 rotates about its own axis as the table 13² rotates. Gear 70 is arranged on shaft 76 between friction discs 71 and 71' and associated plates 73 and 74. A clutch collar 80 under compression of a spring 75 normally holds gear 70 in driving relation to shaft 76 enabling gear 70 to transmit rotary motion to gear 58. Release of the clutch is effected at times, however, by a clutch release rod 82 occupying the bore of shaft 76 and at its bottom end coupled to the clutch collar 80 by a cross pin 83. The rod 82 at its upper end is coupled to a lever 85 carrying a roller 86 which is lowered at the appropriate times by a cam track 90 (Figs. 2, 8 and 10).

During transfer of an orifice plate 61 between a support 57 and turret 14, it is essential that the support 57 be in a particular rotary position relative to the turret and that it remain so until transfer is completed. The assembly 50 is accordingly provided with a latch assembly (Fig. 7) comprising a stop 91 attached to support 57 and a cooperative slide or bolt 92. Bolt 92 is allowed to lower by gravity into locking relation with stop 91 and is raised when rotation of support 57 is to be resumed, by a cam track 93 (Fig. 8) cooperative with a roller 94 carried by the bolt 92. As will be understood, the contour of track 93 is such that it permits bolt 92 to lower into the path of stop 91, sufficiently in advance of the disengagement of the clutch, to insure that stop 91 will be engaged before rotation of support 57 ceases.

First orifice plate transfer

Fig. 1 shows one of the orifice plates 61 on turret 14 after the plate has been indexed into the loading position. Plate 61 is arranged between suitable rails $14^1$ and $14^2$ which serve to guide the plate during its transfer to the support 57 of a blowhead assembly, such as the assembly 50 (Figs. 2, 4, 8, 11, and 12). This transfer is effected by a pusher 100, in Figs. 1 and 2 shown in the retracted position, and in Figs. 11 and 12 shown after having advanced to transfer plate 61 to support 57. Pusher 100 is driven by a crank 101 and guided by a crank 102 in a manner to advance the pusher over a path which is transverse to substantially the same section of the outer turret while passing thereacross so as to maintain the pusher in substantial alignment with the axial center of the orifice plate throughout the advance movement of the pusher. Cranks 101 and 102 are driven by spur gears 104 and 105 respectively in mesh with a drive gear 106. Gear 106 is carried by a drive shaft 107 which receives its drive by a worm wheel 108 in mesh with a worm 109 (Figs. 1 and 2) carried by the main drive shaft assembly generally designated 110 (Figs. 1 and 2). The crank 101 is driven one complete revolution during each indexing operation.

Turret drives

Turret 13 is continuously driven by a worm, not shown, on the drive shaft assembly 110 and in mesh with the worm wheel 20 (Fig. 2). The drive shaft assembly 110 is continuously driven by a motor 116 via variable speed control unit 117 (Fig. 1).

The drive of turret 14 is through a bevel gear 118 (Fig. 1) carried by shaft assembly 110 and in mesh with a bevel gear 119 on one end of a shaft 120. The other end of shaft 120 has a chain drive 121 (Figs. 1 and 13) to a countershaft 122. The shaft 122 carries a drive pinion 113 which is in mesh with a drive gear 114 of an indexing unit having a cam 124 adapted to advance a gear 125 in step-by-step fashion. Gear 125 is in mesh with a pinion 123 on the bottom end of a turret drive shaft 127 the upper end of which has a drive pinion 126 in mesh with a ring gear 130 (Fig. 2) attached to turret 14. In short, the drive is such that turret 14 is indexed one position for each revolution of cam 124.

Puff and blow

Puff and blow air is supplied to each blowhead, via puff and blow valves 68 and 69 (Figs. 3, 5, 6 and 7), individual thereto. Air is supplied to these valves from a puff box 136 (Figs. 1 and 4) and from a blow box 137 (Fig. 1) connected to valves 68 and 69 by lines 138 and 139 (Figs. 3 and 6) extending thereto from a circular manifold 140 (Figs. 3 and 4) arranged on table $13^2$. As an inspection of Figs. 3 and 4 will show, the puff and blow box sections are closed on their bottom side by a separator ring 145 which has attached to its bottom side a wearing plate 146 against which the upper side of manifold 140 rides. Puff air lines, such as line 138, are available to the puff box 136 via apertures, such as apertures 150, through the wearing plate 146. Blow air lines, such as line 139, are available to blow box 137 via apertures, such as apertures 151 in plate 146. The separator ring 145 is perforated and channeled to supply air to outlets 141 and 141' in manifold 140 through the wearing plate apertures, such as apertures 150 and 151. Cooperative with each aperture of separator ring 145 is an adjustable slide 152 which may be set to block flow of any air therethrough, to restrict the volume of air which flows therethrough, or to connect the aperture direct to atmosphere via an outlet 153 as needed. As will be understood, the puff and blow valves 68 and 69 comprise a means for further restricting the supply of puff and blow air to compensate for the individual characteristics of the blowheads they serve.

Second orifice plate transfer

Return of an orifice plate 61 to turret 14 is arranged to occur soon after a pair of mold halves 26—27 have moved clear of a finished article. Return of an orifice plate 61 to turret 14 is effected by a pusher 155, individual to each mold position, best shown in Fig. 4, suspended from arms 156 and 157. A cam 163 (Figs. 4, 5 and 10) acts on a roller 162 carried by a pivoted lever 161 and coupled to arm 156 by a ball and socket linkage 160 to prevent an associated spring 158 from actuating pusher 155 to effect the transfer until the mold halves are clear of the finished article. After transfer, cam 163 again returns pusher 155 to the position shown.

Crack-off and cullet removal equipment

The crack-off equipment (Figs. 1, 19 and 20) comprises a crack-off assembly, generally designated 325, supported on bed 11 by a bracket 326 and adjustable as to height and laterally in accordance with the size of ware being formed by cranks 327 and 328. The crack-off equipment proper comprises a cylinder 330 having a piston 331 to the rod of which is attached a crack-off hammer 332. The piston 331 is actuated by air supplied by a valve 333 under control of pilot valves 334 and 335 actuated at the proper times by cams 336 and 337 carried by the orifice plate pusher shaft 107 (Fig. 2). The control and pilot valves 333, 334 and 335 are similar to valves 291 and 281 shown in section in Fig. 22 and hereinafter fully described.

The cullet removing equipment comprises a fixed knife 340 (Figs. 1 and 21) and means for directing a blast of air against the cullet comprising an air pipe 341. Knife 340 is so positioned that its blade 340' becomes wedged between the cullet 342 and an orifice plate just as the crackoff position is reached. The cullet 342 comes under the influence of an air blast from pipe 341 as the orifice ring is being indexed from the crackoff position. The air blast directs the cullet as it is lifted free of the plate into the cullet chute (Fig. 1). If desired, a water spray may be applied to the cullet to quickly chill it to further assist in freeing it from the orifice plate. A few subsequent indexing movements of turret 14 brings the orifice plate back to the loading position, thus completing its operating cycle.

*Shearing, parison forming and delivery to orifice plates*

Figure 14:
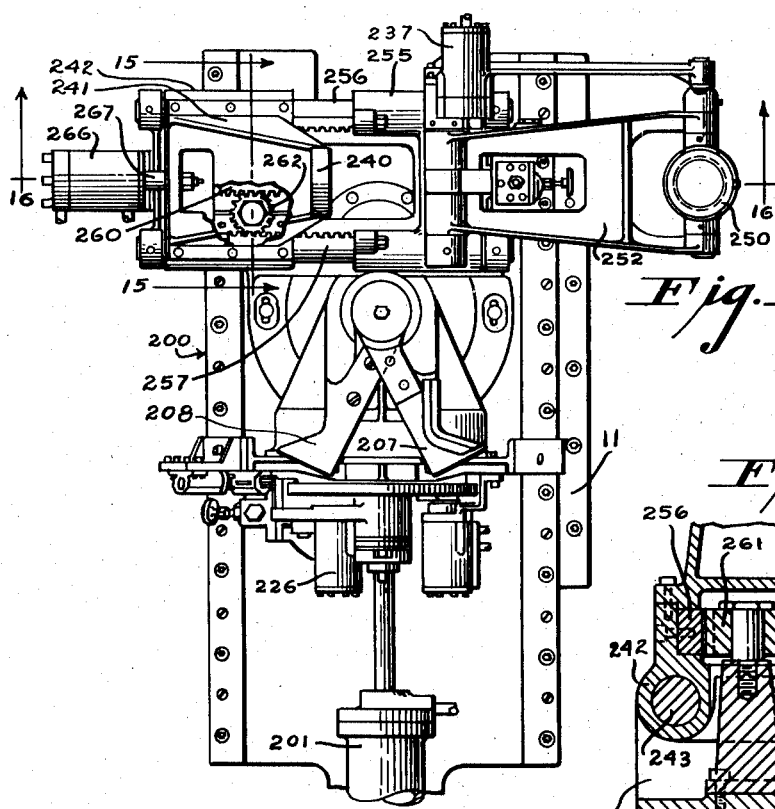
Fig. 14 is an enlarged plan view of the shearing, parison forming and transfer assembly.
Figure 15:
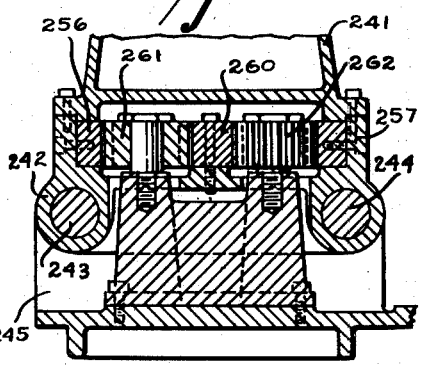
Fig. 15 is a view taken on line 15—15 of Fig. 14.

The shearing, parison forming and delivery apparatus, (Figs. 14–18c) generally designated 200, is mounted as a unitary assembly on an extension 11' of table bed 11, as best illustrated in Fig. 18, and is coupled to a pneumatic unit 201 (Figs. 14 and 18) by means of which it may be moved from under the bottom outlet or glass feeder orifice 265 (Fig. 17) for inspection, repair, or when operation of the machine is to be interrupted.

*Shear mechanism*

The shear mechanism is supported by a main frame 205 (Fig. 17) which houses a vertical shaft 206 to the upper end of which a shear blade 207 is attached. Shaft 206 is surrounded by a tubular shaft 210 to which the companion shear blade 208 is attached. The bottom ends of shafts 206 and 210 are provided with bevel pinions 211 and 212 arranged in mesh with a drive pinion 213 carried by a horizontal shaft 214. Shaft 214 carries a pinion 215 in mesh with a drive gear 216 mounted on a second horizontal shaft 217. Shaft 217 has associated therewith a step-by-step drive mechanism including a disk 220 (Figs. 17 and 18) mounted thereon having four drive apertures 221 equally spaced in a circle about its axis and an associated arm 225 oscillatable on the shaft carrying a pneumatic unit 226 provided with a drive pin 227 (Fig. 22) adapted to enter apertures 221. A second pneumatic unit 230 is connected to the free end of arm 225 by a linkage 231 and has a sufficient stroke to turn disk 220 exactly one-fourth revolution, which, owing to the ratio of the gear 216 and pinion 215 is sufficient to rotate the shear blades one complete revolution. A pneumatic unit 235 (Figs. 18 and 22), also associated with disk 220, has a pin 236 (Fig. 22) which enters one of the apertures 221 at the end of the advance stroke of unit 230 to hold the disk against retroactive movement during the return stroke of arm 225. Timing and control of the respective pneumatic units will be explained later.

*Parison forming and transfer*

Figure 16:
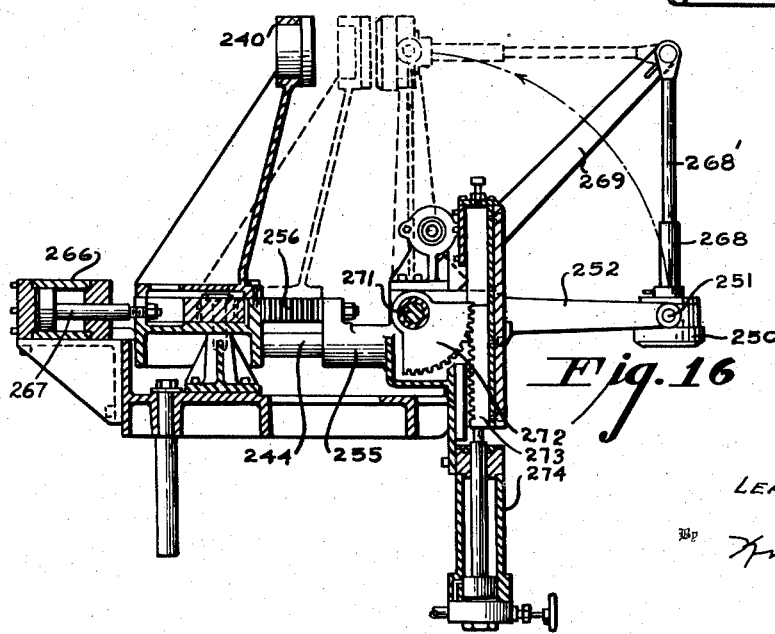
Fig. 16 is a view, taken on line 16—16 of Fig. 14.

The parison forming mechanism (Figs. 14, 16, 17 and 22) comprises a forming member 240 supported on a bracket 241 attached to a carriage 242 slidably arranged on slide rails 243 and 244 carried by a support 245. A cooperative forming cup member 250 is pivotally connected at 251 to support 252 which is fixed to a horizontal shaft 271 in turn mounted in suitable bearings on a carriage 255 (Figs. 14 and 16) also slidable on rails 243 and 244. Racks 256 and 257 attached to carriage 255, and a double rack bar 260 (Figs. 14 and 15) attached to carriage 242 and cooperative pinions 261 and 262 mechanically link the carriages to one another in such a manner that movement of one carriage toward or away from the center line of the feeder outlet 265 causes a similar movement of the remaining carriage. This movement is effected by a pneumatic unit 266 having its drive rod 267 connected to carriage 242. The forming member 250, in addition to being pivoted at 251, is attached to a linkage including telescoping arms 268 and 268' and an associated fixed arm 269. As previously mentioned, support 252 is secured to one end of a shaft 271. Shaft 271 also has keyed thereto a sector gear 272 in mesh with a rack 273 secured to a pneumatic unit 274 (Figs. 16 and 18). The arrangement is such that by operation of unit 274 it is possible to swing cup support 252 between horizontal and vertical positions and, owing to the linkage afforded by arms 268 and 268', the member 250 is brought from a position facing member 240 to an open side-down position.

Forming member 250 (Fig. 18c) is of the general type shown in the cited Gray et al. patent and has an annular channel 258 through which cooling water is circulated via tubes 278 and 279. A fluid line 275 is also connected with perforations 276 which communicate with the glass engaging surface 250'. Line 275 extends to a two-way valve 306 (Figs. 18a and 18b) having ports 307 and 308 connected with vacuum and air pressure lines 309 and 310 respectively. The valve 306 has a rotor 312 normally biased by a spring 313 to a position in which the vacuum line 309 is in communication with line 275, but is adapted to be operated by a trigger 316 engaged by shear operating arm 225, during its restoring movement, to momentarily connect the air pressure line 310 to line 275. Valve 306 is not operated during the shear operating movement of arm 225 as the trigger 316 simply rotates about a pivot 317 against the tension of a spring 318. The operation of valve 306 to apply pressure to line 275 occurs just as the forming member 250 arrives at the delivery position and is effective to positively eject a parison from the member.

*Timing and control*

As hereinafter pointed out, the various elements of the machine, excluding the operation of the crack-off mechanism, are operated either directly or indirectly through the action of suitable cam tracks. The pneumatic units by means of which shearing, parison forming and delivery of a parison to an orifice plate which has been indexed at a loading position by table 14 are effected, can best be described by reference to Fig. 22 and are initiated in proper timed relation by the operation of pilot valves 281—289 and 298. Valves 285—289 and 298 are adapted to be operated by associated cams carried by drive shaft 107 of the pusher mechanism (Figs. 2, 12 and 22). Valves 281 and 282 are operated by a shoe 315 carried by the pusher drive crank 101 and pilot valves 283 and 284 are operated by the shear drive arm 225. The foregoing pilot valves supply operating air to their respective pneumatic units through associated control valves 291—295. The pilot and control valves are alike, and accordingly a description of valves 281 and 291 will suffice for all. Pilot valve 281 is of the spring closed poppet type having an operating stem 281' held in closed position by a spring 290. A branch line 301' of a main compressed air supply line 301 is connected with the inlet 302 of the valve and its outlet is connected by a line 303 to an end of control valve 291. Outlet 305 is a bleeder opening to atmosphere.

The control valve 291 is of conventional construction comprising a cylinder A having exhaust apertures EX, an air inlet aperture A' connected to the branch 301' of air supply line 301, and apertures $A^2$ and $A^3$ through one or the other of which the valve supplies operating air to one end of unit 230 and through the remaining one of which it exhausts the other end of the unit to atmosphere through one of the apertures EX under control of a spool S shifted back and forth in cylinder A by air supplied through passages in the ends of the cylinder by the pilot valves 281 and 282.

*Shearing operation*

As shown in Fig. 22, shear pilot valve 283 has just been operated and accordingly the spool of control valve 292 is in position to supply operating air to the lower end of the cylinder locking pin unit 235 so that the pin 236 is withdrawn from locking relation with disk 220. In the unlocked position, unit 235 via line 228 supplies air to the upper end of the drive pin unit 226 so that its pin 227 is in an aperture of disk 220.

The foregoing conditions exist during an indexing movement of table 14. During the final stage of the advance movement of pusher arm 100 (Figs. 11, 12 and 22) shoe 315 engages and operates shear pilot valve 282 which accordingly supplies air to conduit 311 to shift the spool S of valve 291 to the position shown in which position it supplies air to the rear end of shear operating unit 230 to turn disk 220 to perform a shearing operation. At the end of the stroke of unit 230, shear lock pilot valve 284 will be actuated to effect the reversal of the spool of valve 292 so that air will be supplied by it as required to reverse the positions of locking and drive pins 236 and 227, thus enabling restoration of the shear driving unit to its initial position under control of pilot valve 281 during the completion of an operating cycle of pusher 100.

*Parison forming and delivery*

Substantially at the same time that shear pilot valve 281 is actuated, pilot valve 287 is actuated so that its control valve 294 operates to supply air to unit 274 to bring member 250 opposite member 240 in position of readiness to seize a gob and is substantially immediately locked in position by a locking unit 237 under control of pilot valve 286 and the associated control valve 293. By the time actual severance of a charge has been effected unit 266 is operated under control of its pilot valve 298 and the associated control valve 295 to seize and press the gob into a parison. The pin 238 of locking unit 237 is withdrawn from the aperture 239 (Fig. 22) in support 252 and the forming members 240 and 250 are returned to their initial positions under control of their pilot valves 285, 288 and 289.

I claim:

1. In a glassworking apparatus, a first orifice plate holder, and a second orifice plate holder rotatable about a common center, means for turning one of said holders intermittently and the other continuously, orifice plates associated with said holders, means for depositing a parison of glass on an orifice plate associated with the intermittently movable holder while the same is stationary, means for transferring the orifice plate and parison to the continuously moving holder during an indexing movement of said first holder, means associated with said continuously moving holder for completing fabrication of the parison into a finished article, means for returning the orifice plate and finished article to said first holder, means for separating the finished article from cullet remaining on the orifice plate, and means for removing the cullet therefrom.

2. In a glass working machine an orifice plate, two orifice plate holders movable about concentric adjacent paths, means for moving said holders about their paths, and means for transferring said plate back and forth between said holders during their movement.

3. In a glass working machine an orifice plate, two orifice plate holders movable about concentric adjacent paths, means for imparting continuous movement to one of said holders and intermittent movement to the other holder, and means for transferring said plate back and forth between said holders during movements of the intermittently moved holder.

4. In a glass working machine, a rotatable turret, a row of orifice plate supports arranged on said turret and concentric with the axis thereof, each having a side open to receive therein an orifice plate, gearing including a clutch coupling for rotating the respective orifice plate supports about their own axes during rotation of said turret, means for stopping turning movement of the supports at a time at which their open sides reach a predetermined definite radial position with respect to said turret, and means for releasing the clutch coupling thereafter.

5. In a glass forming apparatus two orifice plate holders arranged alongside one another with means providing concentric paths of travel therefor, orifice plates carried by each orifice plate holder at all times, means for moving the respective orifice plate holders about their paths of travel, and means for shifting orifice plates back and forth between said holders.

6. In a glass working apparatus, two structural units mounted for rotation about the same vertical axis, means for rotating one of said units in setp-by-step fashion, means for rotating the other of said units continuously, an orifice plate associatable with either of said units, means for forming and delivering a parison of glass to said orifice plate while it is associated with one of said units, means for transferring the plate and parison to the other of said units, means associated with said other unit to complete fabrication of the parison into an article of ware, means for transferring the orifice plate and article of ware back to the unit initially carrying said plate, and means for removing the article from the orifice plate.

7. In a glass working machine, two turrets rotatable about a common center, means for rotating one of said turrets intermittently, means for rotating the remaining turret continuously, orifice plates associated with said turrets, and means for moving said plates from one turret to the other during movement of said turrets.

8. In a glass working machine, a turret unit mounted to rotate, an annular unit having orifice plate positions thereon, and said unit being arranged to rotate about the axis of said turret unit, said turret unit having orifice plate supports arranged thereon opposite some of said positions, and means for continuously turning one of said units and for intermittently imparting turning movements to the other of said units in a manner to successively laterally align the supports of said first unit with different positions of the other unit while both units are in motion.

9. In a glass working machine, a turret unit mounted to rotate, an annular unit having orifice plate positions thereon, said annular unit being arranged to rotate about said turret unit, means for simultaneously imparting turning movements to said units, orifice plate supports carried by said turret unit, orifice plates carried by said units, and means for transferring said plates between a support of the turret unit and a position on the other unit while both units are being turned.

10. In a glass working machine, a turret unit mounted to rotate, an annular unit arranged to rotate about said first unit, orifice plate supports carried by one of said units said annular unit having orifice plate positions thereon, orifice plates carried by said units, means for simultaneously turning both of said units, and means for transferring plates between said units while both units are turning.

11. In a glass working apparatus, a turret having a circular row of orifice plate supports and blowhead assemblies cooperative with orifice plates carried by said supports, means for continuously rotating said turret, a second turret surrounding the first having orifice plate positions thereon, means for indexing said second turret to index orifice plates arranged thereon through loading and unloading positions, means for depositing a parison on an orifice plate in loading position, means for transferring the loaded plate to one of said orifice plate supports, means including the cooperative blowhead assembly for shaping the parison into a finished blown article, means for transferring the loaded plate back to the second turret, and means for removing the finished article from the plate.

12. In a glass working machine two turrets rotatable about the same axis, orifice plates carried by said turrets, means operatively associated with one of said turrets for delivering a parison of glass to an orifice plate arranged thereon, means for simultaneously turning both turrets, means for transferring the loaded orifice plate to the other turret while both turrets are turning, means associated with said other turret for fabricating the parison into a finished article, other means operatively associated with said other turret for transferring the orifice plate and finished article as a unit back to said one turret, and means for unloading the finished article from its orifice plate, said last means including a crack-off device arranged below the orifice plate and cullet removing means arranged above the orifice plate.

13. In a glass working machine, a turret continuously rotatable about a vertical axis, means for turning said turret, a combined blowhead and orifice plate support assembly arranged on one portion of said turret, a mold assembly on another portion of said turret under and in vertical alignment with said first assembly, means for supplying puff and blow air to said blowhead in its course of travel with said turret, an indexing type turret adjacent and surrounding said first turret, means for indexing said latter turret, an orifice plate arranged on the latter turret, means for depositing a parison of glass on the orifice plate between indexing movements of the latter turret, means for transferring the orifice plate to said combined blowhead and orifice plate support assembly during a subsequent indexing movement of said latter turret, means for bringing said blowhead and mold into cooperative relation with the parison to form it into a finished article, and means for transferring the orifice plate and article as a unit back to said indexing turret.

14. In a glass working apparatus an outer turret and an inner turret, means for indexing said outer turret while rotating said inner turret continuously, an orifice plate carried by said outer turret, an orifice plate pusher, means to drive said pusher to engage and transfer said plate from said outer turret to said inner turret and to return said pusher to its starting position while the outer turret is indexing, and a crank operatively connected to said driving means and pusher to positively maintain the plate engaging portion of said pusher transverse the same section of said outer turret while passing across the area occupied by said outer turret.

15. In a glass working apparatus an outer turret and an inner turret, means for indexing said outer turret while rotating said inner turret continuously, an orifice plate carried by said inner turret, an orifice plate pusher, and means to drive said pusher to engage and transfer said plate from said inner turret to said outer turret while said outer turret is indexing.

LEANDER N. POND.

REFERENCES CITED

The following references are of record in the file of this patent:

UNITED STATES PATENTS

| Number | Name | Date |
|---|---|---|
| 962,519 | Nicholls | June 28, 1910 |
| 2,032,075 | Weber | Feb. 25, 1936 |
| 2,251,010 | Allen | July 29, 1941 |
| 2,263,126 | Gray et al. | Nov. 18, 1941 |
| 2,357,501 | Carnahan | Sept. 5, 1944 |
| 2,391,963 | Gray | Jan. 1, 1946 |
| 2,405,557 | Bonnefoy-Cudraz | Aug. 13, 1946 |